April 27, 1965 A. M. LIEBERMAN 3,181,120

DEVICE FOR THE AUTOMATIC RECOGNITION OF WRITTEN OR PRINTED CHARACTERS

Filed April 7. 1961 2 Sheets-Sheet 1

INVENTOR.
ARTHUR M. LIEBERMAN
BY
Percy P. Lantzy
ATTORNEY

INVENTOR.
ARTHUR M. LIEBERMAN
BY
ATTORNEY 3,181,120

DEVICE FOR THE AUTOMATIC RECOGNITION OF WRITTEN OR PRINTED CHARACTERS

Arthur M. Lieberman, Forest Hills, N.Y., assignor to International Telephone and Telegraph Corporation, New York, N.Y., a corporation of Maryland Filed Apr. 7, 1961, Ser. No. 101,534
16 Claims. (Cl. 340—146.3)

This invention relates in general to a device for the automatic recognition of written or printed characters and in particular to a device, for use in a character-recognition system, in which the characters to be recognized are simulated or synthesized in a potential filed and the resulting field variations are evaluated to determine the geometry of the character. Its principal object is to provide a new and simplified recognition system.

In prior-art devices utilizing potential fields and evaluating equipment to determine geometric configurations, a potential field is created which is composed of lines of constant potential generally corresponding to the contours of the geometric configuration to be determined. The potential gradients of this field are determined and the geometry of the configuration evaluated therefrom. In all of these devices utilizing the principle of potential gradients the only potential field created is that field which defines the geometric configuration to be studied or evaluated. (It is to be noted that the term "potential gradients" used here and later is not meant to be relegated to only precise partial derivatives; it includes spatial potential changes and differences which are also indicative of the field slope and hence the shape of the field margins.)

One example of such a prior-art device is the electric tank wherein the exterior of the tank is at ground potential and a potential field is created only when an electrode having a potential thereon is placed in the interior of the tank.

Another example is the character-recognition device disclosed in the patent application of K. Steinbuch, Serial No. 728,732, filed April 15, 1958, now Patent No. 3,088,096 and entitled "A Method for the Automatic Recognition of Characters." In this application, a network of intersecting rows of resistors is grounded at its periphery and potentials supplied by a photocell scanning device scanning a character are applied to corresponding crosspoints of the network to create a potential field corresponding to the scanned character.

It is an object of the present invention to provide a character-recognition device wherein a potential field is first created and then altered when a geometric configuration is placed, synthesized or simulated therein.

It is another object to provide apparatus wherein the potential field is continuously altered and the evalution of the geometric configuration causing such continuous alteration is accomplished at predetermined times. This overcomes the requirement of prior-art devices that the configuration to be evaluated must be stationary and accurately positioned in the potential field.

A feature related to the last mentioned object resides in the arrangement wherein a potential field is first created in a plate of photo-conductive material, which field is then altered by a light image of a character on a moving record being focused on the plate and being moved thereacross.

Other objects and features of the invention will become apparent and the invention will be best understood by reference to the accompanying specification taken in conjunction with the drawings comprising FIGS. 1 to 6 wherein:

FIG. 1 shows the general layout of the character recognition system of the invention with a printed character being imaged on a plate of photo-conductive material;

FIG. 1*a* shows the arrangement of one of the probes of the photo-conductive material;

FIG. 2 shows an example of lines of constant potential on the photo-conductive plate when a light image of a character is focused thereon; and FIGS. 3 to 6 show the relationship existing between the potentials appearing on the probes of each set when the lines of constant potential have various geometric configurations.

It has been chosen to illustrate the invention as utilizing a rectangular plate of photo-conductive material whose conductivity is uniform throughout. Also, it has been chosen to describe a system utilizing the impingement of light on the surface of the photo-conductive material to cause the mark, symbol or character to affect the resistivity of the photo-sensitive material. Further, it has been chosen to apply a potential across the plate and to measure potential gradients caused by the noted resistance changes. While the noted potentials are disclosed as applied to the edges of the plate of photo-conductive material, such potentials could be applied at other positions.

When the above selected apparatus and techniques are combined, a potential field is first created in the photo-conductive plate. When a light image is directed onto the photo-conductive plate, the conductivity of the area under the light is increased and the original potential field is distorted in accordance with the geometric shape of the light image. The distortion is essentially in accordance with the constant potential theory exemplified by the noted electric tank. The resulting distorted potential field is measured at predetermined points and evaluated to determine the geometric shape of the light image.

Referring now to FIG. 1 of the drawings, a lens system is shown wherein light from source LS is reflected from a moving record medium 5 and focused on the surface of the photo-conductive plate through lens 4.

The record medium 5 may be any record containing a sequence of printed or written characters to be recognized. The record is moved in the direction indicated by arrow $f_1$ and the image of the characters thereon are successively moved across the surface of photo-conductive plate 1 in the direction indicated by arrow $f_2$.

The photo-conductive plate 1 may be any photo-conductive material which changes its conductivity when light impinges thereon. A pair of conductors 2 and 3 are secured to one set of opposite edges of the plate 1 and a voltage from source BS is impressed thereacross. This creates a field of constant potential whose potential lines are relatively parallel and extend transversely of plate 1 between conductors 2 and 3. When light is projected onto plate 1, the conductivity of this material is increased at those areas where light strikes the plate. The increase in conductivity of the photo-conductive material at certain areas, changes the original conductivity between conductors 2 and 3 and consequently distorts the parallel potential lines.

FIG. 2 shows a typical configuration of lines of constant potential in plate 1 when the number "2" is projected thereon with the top of the numeral coinciding with conductor 2. For purposes of explanation these lines are designated $P_1$, $P_2$, $P_3$, and $P_4$.

Assuming that the image of the numeral "2" coincides with conductor 2, the surface of plate 1 which is covered by the image will essentially assume the potential on conductor 2. Then potential line $P_1$ will approach the potential of source BS; potential line $P_2$ will have a lesser potential, potential line $P_3$ will be smaller still and so forth. It will be noted that the potential field, when distorted, has the lines of constant potential generally following the geometric shape of the image appearing on plate 1. However, the field distortion in the vicinity of the concave portion of the image is quite different from the distortion in the vicinity of the convex portion of the image.

Assuming a potential probe similar to that indicated in FIG. 1*a* is located in the right section of plate 1 and assume that an image is projected on the left section of this plate and moved towards the probe. It is clear that the potential on the probe would be small at first, increase in value until the image reached the probe and then decrease as the image passed the probe.

When three probes are aligned in the right section of the plate and parallel with the direction of movement of the image, the extreme right probe will have a potential thereon smaller than the other two probes when the image is in the left section of the plate. However, when the image passes the three probes, the relative potential values will be reversed with the left probe then having the least potential.

Figure 4:
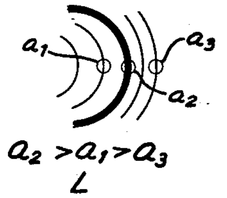
FIG. 4 illustrates the relationship existing between the potentials on probes $A_1$, $A_2$, and $A_3$ when the image shape element is curved to the left and when the center of the shape element is positioned on probe $A_2$. At that position, the potential $a_2$ is the greatest while potential $a_1$ is less than potential $a_3$ and both are smaller than potential $a_2$.
Figure 5:
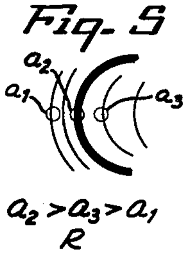
FIG. 5 illustrates the relationship existing between the potentials in probes $A_1$, $A_2$, and $A_3$ when the image shape element is curved to the right and when the center of the shape element is positioned on probe $A_2$. At that position, potential $a_2$ is the greatest while potential $a_3$ is less than potential $a_1$ and both are smaller than potential $a_2$.
Figure 6:
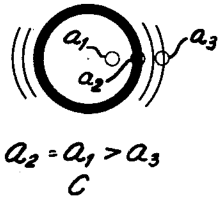
FIG. 6 illustrates the relationship existing between the potentials on probes $A_1$, $A_2$, and $A_3$ when the image shape element is a complete circle and when the right portion of the shape element is positioned on probe $A_2$. At that position, potentials $a_1$ and $a_2$ are equal and greater than potential $a_3$.

Hereinafter, when the straight-line shape elements have their potential field measured and evaluated, the resulting evaluation will be termed an "E" characteristic. Similarly, the evaluation of the shape elementof FIG. 4 will be termed an "L" characteristic, the evaluation of the shape element of FIG. 5 will be termed an "R" characteristic and the evaluation of the shape element of FIG. 6 will be termed a "C" characteristic.

Figure 1:
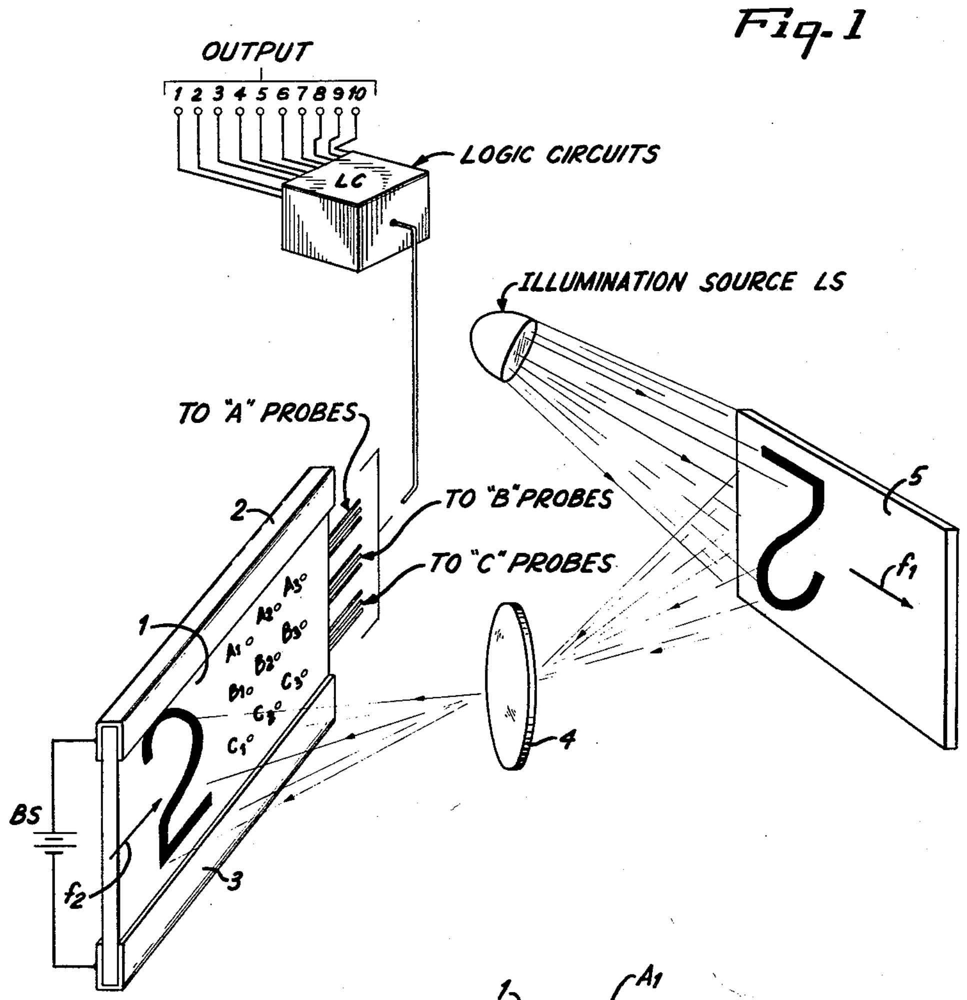
Figure 1A:
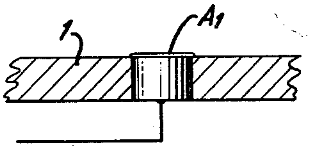
Figure 2:
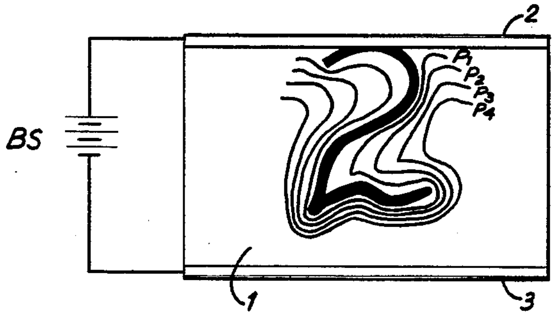

Referring again to FIG. 1, three sets of probes are shown. Each set functions in the manner above described in detecting the characteristic of its associated portion of the image. It has been chosen to position the "A" set of probes to measure the potential field in the vicinity of the upper portion of the numerical image, to position the "B" set of probes in the vicinity of the middle portion; and to position the "C" set of probes in the vicinity of the lower portion. In this way, three characteristics can be determined from each numeral.

The three sets of probes are shown associated with logic circuit LC. Circuit LC may be any well-known logic array adapted to ferret one result from a plurality of indications and is not disclosed in detail. For an example of such a logic circuit recourse may be had to the shape determiner and translator portions of the previously mentioned Steinbuch application. This circuit may be arranged so that the potential on each probe of any set is read when the center probe thereof reaches a maximum or predetermined level. The potentials read on each probe set are evaluated in order to provide an indication of the identity of the numeral.

Figure 3:
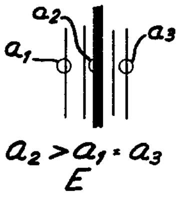
FIG. 3 illustrates the above potential relationships existing between probes $A_1$, $A_2$, and $A_3$ when the image shape element is a straight line and when the center of the shape element is positioned on the main probe. At that position, the potentials $a_1$ and $a_3$ are equal and smaller than potential $a_2$.

Referring again to FIG. 3, the potential relationship shown therein will appear on all three sets of probes when the numeral "1" is swept across plate 1. Thus, when the numeral "1" is to be recognized, probe sets "A," "B" and "C" in conjunction with the logic circuit LC will indicate an "E" characteristic.

The following table sets forth three sets of typical characteristics for each of the numerals 1 through 0.

| Numeral | 1 | 2 | 3 | 4 | 5 | 6 | 7 | 8 | 9 | 0 |
|---|---|---|---|---|---|---|---|---|---|---|
| Probe Set A | E | L | L | C | R | R | L | C | C | C |
| Prode Set B | E | L | X | X | L | R | X | E | L | C |
| Probe Set C | E | R | L | E | L | C | E | C | L | C |

The characteristics indicated by "X" relate to those probe sets and numerals in which an ambiguous reading will probably occur for the limited number of probe sets used. However, these characteristics are not essential for an unambiguous recognition of their corresponding numeral.

While only three sets of probes are shown, it is clear that numerous sets could be employed and the combinations accordingly increased, as the number of and types of marks, symbols or characters that is to be unambiguously recognized is increased.

While the material disclosed in the foregoing embodiment of the invention is photo-conductive it is to be understood that any of numerous other resistive materials could be utilized. Also, other methods of synthesizing a character on the selected material could be utilized, such methods including depositing matter on the material, applying a current or a voltage to the material, or causing a chemical action or reaction. The selected material may have any desired shape, whether uniform or not and may or may not have uniform resistive characteristics. The detection of the potentials may be accomplished from the exterior or interior of the materials or from the outer edges or within the confines thereof. Also, the mark, symbol or character may be stationary on the material, moving, spasmodic or erratic.

While I have described above the principles of my invention in connection with specific apparatus, it is to be clearly understood that this description is made only by way of example and not as a limitation to the scope of my invention, as set forth in the objects thereof and in the accompanying claims.

What is claimed is:

1. A character-recognition system comprising in combination a single display-target of resistive material, means for creating a constant potential field across a surface of said material, means for altering the pattern of constancy of said potential field wherein said pattern is altered in accordance with and indicative of a character to be recognized, means for detecting alterations of potential gradients in said altered pattern of constancy of said potential field, and means coupled to said detecting means for evaluating said potential gradients to identify said character.

2. A character recognition system as set forth in claim 1 wherein the said resistive material has uniform resistive characteristics.

3. A character recognition system as set forth in claim 1, wherein said means for altering the said pattern of constancy of said potential field in accordance with a pattern indicative of a character to be recognized includes means for impressing a single representation of the shape of said character, from a single source of characters, on the surface of said material.

4. A character recognition system as set forth in claim 1, wherein the said means for altering said pattern of constancy of the potential field in accordance with a pattern indicative of a character to be recognized includes means for synthesizing the character shape in said material.

5. A character-recognition system comprising in combination a single display-target of resistive material, means for creating a constant potential field across a surface of said material, means for continuously altering the pattern of constancy of said potential field, said pattern alterations at any time being in accordance with and indicative of a character to be recognized, means for detecting alterations of potential gradients in said altered pattern of constancy of said potential field, and means coupled to said detecting means for evaluating said potential gradients at a predetermined time to identify said character.

6. A character recognition system as set forth in claim 5, wherein the said material is photo-conductive and wherein the means for continuously altering the said pattern of constancy of the said potential field of said material includes means for sweeping a light image of the character to be recognized across the surface of said material.

7. A character recognition system as set forth in claim 5, wherein the said means for sweeping the said image across the surface of said photo-conductive material includes a moving medium having the character to be recognized appearing thereon and includes a light source and lens system for projecting the said image of the character on the said material.

8. A character recognition system comprising in combination a body of resistive material, means for creating a potential field in said material, means for altering said potential field in accordance with the shape of a character to be recognized, a plurality of potential probes attached at predetermined points to said body for detecting potential gradients in said altered field, and means for evaluating said gradients to identify the said character.

9. A character recognition system as set forth in claim 8 wherein the said means for evaluating includes means for evaluating predetermined of said potential gradients simultaneously.

10. A character recognition system as set forth in claim 8 wherein the said means for evaluating includes means for evaluating predetermined of said potential gradients at the time a predetermined one of said potential probes detects a potential of a predetermined amplitude.

11. A character recognition system comprising a body of photo-conductive material, means for creating a potential field in said material, light image means for altering said potential field in accordance with a pattern indicative of a character to be recognized, means for detecting potential gradients in said altered field, and means coupled to said detecting means for evaluating said gradients to identify the said character.

12. A character recognition system comprising means for creating a constant potential field, means for distorting the pattern of constancy of said potential field by the introduction of the character to be recognized as a substantially uniform conductance therein, means for detecting potential gradients in the distorted pattern of constancy of said field, and means for evaluating said detected gradients whereby the character is determined.

13. A character recognition system comprising in combination a single display-target of resistive material; means for creating a constant potential field across a surface of said material; means for introducing in said constant potential field a uniform conductance simulating the shape of the character to be recognized to distort the pattern of constancy of said potential field; probe means for deriving potentials from said distorted pattern of constancy of said potential field; and logic means, coupled to said probe means, for evaluating said derived potentials to identify the character.

14. A character recognition system comprising a single display-target of photo-conductive material; means for creating a constant potential field across a surface of said material; means for light imaging the character to be recognized on said material, to distort the pattern of constancy of said field; probe means for deriving potentials from said distorted pattern of said potential field; and logic means, coupled to said probe means, for evaluating said derived potentials to identify the character.

15. A character recognition system as claimed in claim 14 in which the light image of the character is swept across the material, and the logic means includes means for evaluating the derived potentials at a predetermined time.

16. A character recognition system comprising a single display-target having a surface containing photo-conductive material; potential means, connected between opposite edges of said material, for inducing a constant potential field across a surface thereof; means for casting a light image of the character to be recognized across said surface; a plurality of potential probes, arranged in distinct tracts, attached to said surface; and logic means, coupled to said probes, for evaluating the potentials derived at said probes at a predetermined time to identify the character.

References Cited by the Examiner

UNITED STATES PATENTS

| | | | |
|---|---|---|---|
| 2,616,983 | 11/52 | Zworykin et al. | 340—149.1 |
| 2,859,427 | 11/58 | McNaney | 340—146.3 |
| 2,879,405 | 3/59 | Pankove | 250—211 |
| 2,892,380 | 6/59 | Baumann et al. | 88—61 |
| 2,896,507 | 7/59 | Mast et al. | 88—61 |
| 2,939,632 | 6/60 | Demer et al. | 340—149.1 |
| 3,016,518 | 1/62 | Taylor | 340—149.1 |

OTHER REFERENCES

Pages 229–232, 1959, Lion: Instrumentation in Scientific Research, McGraw Hill.

MALCOLM A. MORRISON, *Primary Examiner.*

WALTER STOLWEIN, *Examiner.*